US012019837B2

United States Patent
Lu et al.

(10) Patent No.: US 12,019,837 B2
(45) Date of Patent: Jun. 25, 2024

(54) CONTROL DISPLAY METHOD AND APPARATUS, DEVICE, MEDIUM, AND PROGRAM PRODUCT

(71) Applicant: Tencent Technology (Shenzhen) Company Limited, Shenzhen (CN)

(72) Inventors: Qingchun Lu, Shenzhen (CN); Hongchang Huang, Shenzhen (CN); Bin Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/742,249

(22) Filed: May 11, 2022

(65) Prior Publication Data

US 2022/0365634 A1 Nov. 17, 2022

Related U.S. Application Data

(63) Continuation of application No. PCT/CN2021/125076, filed on Oct. 20, 2021.

(30) Foreign Application Priority Data

May 14, 2021 (CN) .......................... 202110526827.6

(51) Int. Cl.
*G06F 3/0481* (2022.01)
*A63F 13/537* (2014.01)

(52) U.S. Cl.
CPC .......... *G06F 3/0481* (2013.01); *A63F 13/537* (2014.09)

(58) Field of Classification Search
None
See application file for complete search history.

(56) References Cited

U.S. PATENT DOCUMENTS

| 9,798,702 | B2 * | 10/2017 | Noguchi | ............... G06F 40/103 |
| 2003/0142109 | A1 * | 7/2003 | Brown | .................. G06F 3/0481 |
| | | | | 345/592 |

(Continued)

FOREIGN PATENT DOCUMENTS

| CN | 108854071 A | 11/2018 |
| CN | 109508128 A | 3/2019 |

(Continued)

OTHER PUBLICATIONS

Tencent Technology, ISR, PCT/CN2021/125076, Feb. 10, 2022, 3 pgs.

(Continued)

*Primary Examiner* — Tuyetlien T Tran
(74) *Attorney, Agent, or Firm* — Morgan, Lewis & Bockius LLP

(57) ABSTRACT

A control display method is performed by an electronic device, the method including: displaying a graphical user interface (GUI), the GUI including a virtual character located in a virtual environment and a control; updating a display position of the virtual character on the GUI as the virtual character moves in the virtual environment; and in accordance with a determination that the control blocks the virtual character at the display position: increasing a transparency of the control. The control display method enables a user to better observe the virtual character that would have been blocked by the control, and dynamic changes of the transparency of the control is more likely to attract the user's attention, so that the user does not miss important information.

20 Claims, 7 Drawing Sheets

(56) References Cited

U.S. PATENT DOCUMENTS

| | | | |
|---|---|---|---|
| 2005/0057497 A1* | 3/2005 | Kawahara | G06F 3/04815 |
| | | | 345/157 |
| 2006/0046844 A1 | 3/2006 | Kaneko | |
| 2007/0067089 A1* | 3/2007 | Yoshida | G02B 27/0101 |
| | | | 701/96 |
| 2008/0043022 A1* | 2/2008 | Ishihara | A63F 13/95 |
| | | | 345/592 |
| 2009/0009424 A1* | 1/2009 | Kang | H04N 5/45 |
| | | | 345/1.3 |
| 2009/0128564 A1* | 5/2009 | Okuno | G06T 19/006 |
| | | | 345/427 |
| 2011/0306417 A1* | 12/2011 | Sheblak | A63F 13/52 |
| | | | 463/32 |
| 2012/0169610 A1 | 7/2012 | Berkes et al. | |
| 2013/0038623 A1* | 2/2013 | Tezuka | A63F 13/42 |
| | | | 345/589 |
| 2013/0324200 A1* | 12/2013 | Okamura | A63F 13/58 |
| | | | 463/43 |
| 2014/0063044 A1* | 3/2014 | Kim | G01C 21/367 |
| | | | 345/592 |
| 2014/0285422 A1* | 9/2014 | Kang | G09G 5/003 |
| | | | 345/156 |
| 2015/0095833 A1* | 4/2015 | Kim | G06F 3/04812 |
| | | | 715/773 |
| 2015/0271444 A1* | 9/2015 | Defazio | H04N 5/45 |
| | | | 348/14.07 |
| 2016/0125484 A1* | 5/2016 | Hanson | H04L 65/403 |
| | | | 705/347 |
| 2016/0127683 A1* | 5/2016 | Hanson | G06Q 30/00 |
| | | | 348/14.08 |
| 2016/0170570 A1* | 6/2016 | Zhang | G09G 5/14 |
| | | | 715/733 |
| 2017/0039867 A1* | 2/2017 | Fieldman | G09B 7/00 |
| 2017/0043251 A1* | 2/2017 | Magdalena | A63F 13/537 |
| 2017/0323428 A1* | 11/2017 | Tang | A63F 13/44 |
| 2018/0011631 A1* | 1/2018 | Ballesteros | G06F 3/04886 |
| 2018/0088682 A1* | 3/2018 | Tsang | G02B 27/00 |
| 2018/0178597 A1* | 6/2018 | Min | B60K 37/06 |
| 2019/0070496 A1* | 3/2019 | He | A63F 13/92 |
| 2019/0118078 A1* | 4/2019 | Li | A63F 13/2145 |
| 2019/0279407 A1* | 9/2019 | McHugh | G06F 3/011 |
| 2019/0318462 A1* | 10/2019 | Kake | G06T 5/006 |
| 2020/0401687 A1* | 12/2020 | Mak | G06T 19/006 |
| 2021/0350611 A1* | 11/2021 | Ishihara | G06F 3/147 |
| 2021/0360372 A1* | 11/2021 | Uzum Vella | H04W 4/029 |
| 2022/0080316 A1* | 3/2022 | Huang | A63F 13/5378 |

FOREIGN PATENT DOCUMENTS

| | | |
|---|---|---|
| CN | 109529319 A | 3/2019 |
| CN | 109550247 A | 4/2019 |
| CN | 112121430 A | 12/2020 |
| CN | 112473126 A | 3/2021 |
| CN | 112753050 A | 5/2021 |
| CN | 113134233 A | 7/2021 |
| JP | 2006068138 A | 3/2006 |
| JP | 2009201667 A | 9/2009 |
| TW | 200839648 A | 10/2008 |
| WO | WO 2012144837 A2 | 10/2012 |
| WO | WO 2020066682 A1 | 4/2020 |

OTHER PUBLICATIONS

Tencent Technology, Extended European Search Report and Supplementary Search Report, EP21893099.8, Dec. 12, 2022, 10 pgs.

Tencent Technology, Japanese Office Action, JP Patent Application No. 2022-562117, Aug. 8, 2023, 11 pgs.

Tencent Technology, WO, PCT/CN2021/125076, Feb. 10, 2022, 6 pgs.

Tencent Technology, IPRP, PCT/CN2021/125076, Nov. 14, 2023, 5 pgs.

* cited by examiner

CONTROL DISPLAY METHOD AND APPARATUS, DEVICE, MEDIUM, AND PROGRAM PRODUCT

CROSS-REFERENCE TO RELATED APPLICATIONS

This application is a continuation application of PCT Patent Application No. PCT/CN2021/125076, entitled "CONTROL DISPLAY METHOD AND APPARATUS, DEVICE, STORAGE MEDIUM AND PROGRAM PRODUCT", filed on Oct. 20, 2021, which claims priority to Chinese Patent Application No. 202110526827.6, filed with the State Intellectual Property Office of the People's Republic of China on May 14, 2021, and entitled "CONTROL DISPLAY METHOD AND APPARATUS, COMPUTER DEVICE, AND STORAGE MEDIUM", all of which are incorporated herein by reference in their entirety.

FIELD OF THE TECHNOLOGY

This application relates to the field of graphical user interfaces, and in particular, to a control display method and apparatus, a device, a medium, and a program product.

BACKGROUND OF THE DISCLOSURE

A graphical user interface (GUI) is the most common human-computer interaction method on a terminal using a touch screen.

In an application program supporting a three-dimensional virtual environment, a virtual world picture and a user interface (UI) control superimposed on an upper layer of the virtual world picture are displayed on the GUI. The virtual world picture is observed by a virtual character located in a virtual world. For example, a virtual character moves in the virtual world, and the virtual world picture is obtained by observing the virtual world from the perspective of observing the virtual character. Therefore, display content in the virtual world picture constantly changes, but a display position of the UI control on the GUI is relatively fixed.

SUMMARY

Embodiments of this application provide a control display method and apparatus, a device, a medium, and a program product. The technical solutions are as follows:

According to one aspect of this application, a control display method is provided. The method is applicable to an electronic device and includes:
displaying a GUI, the GUI including a virtual character located in a virtual environment and a control;
updating a display position of the virtual character on the GUI as the virtual character moves in the virtual environment; and
in accordance with a determination that the control blocks the virtual character at the display position:
increasing a transparency of the control.

According to another aspect of this application, a control display apparatus is provided. The apparatus includes:
a display module, configured to display a GUI, the GUI including a virtual character located in a virtual environment and a control;
an update module, configured to update a display position of the virtual character on the GUI as the virtual character moves in the virtual environment; and
a transparency change module, configured to increase a transparency of the control in accordance with a determination that the control blocks the virtual character at the display position.

According to another aspect of this application, a computer device is provided. The computer device includes a processor, a memory connected to the processor, and program instructions stored on the memory, the processor, when executing the program instructions, implementing the control display method provided in the aspects of this application.

According to another aspect of this application, a computer-readable storage medium is provided. The computer-readable storage medium stores program instructions, the program instructions, when executed by a processor, implementing the control display method provided in the aspects of this application.

According to one aspect of this application, a computer program product is provided. The computer program product includes computer instructions, the computer instructions being stored in a computer-readable storage medium. A processor of a computer device reads the computer instructions from the computer-readable storage medium, and executes the computer instructions, to cause the computer device to perform the foregoing control display method.

The embodiments of this application include at least the following beneficial effects:

When a virtual character moves in a virtual environment, a blocking relationship between a display position of the virtual character on a GUI and a position of a control is determined. When the virtual character is blocked by the control, a transparency of the control is increased, to make the control transparent. In this way, a user can observe the virtual character blocked by the control, and dynamic change of the transparency of the control is more likely to attract the user's attention, so that the user can better grasp the real-time situation on the GUI. For example, when the virtual character moves to a position of a control with a larger display area and is blocked by the control, the transparency of the control is increased, so that the user can see the virtual character through the control, and more quickly grasp the real-time movement situation of the virtual character on the GUI, so that no information is missed.

DESCRIPTION OF EMBODIMENTS

Figure 1:
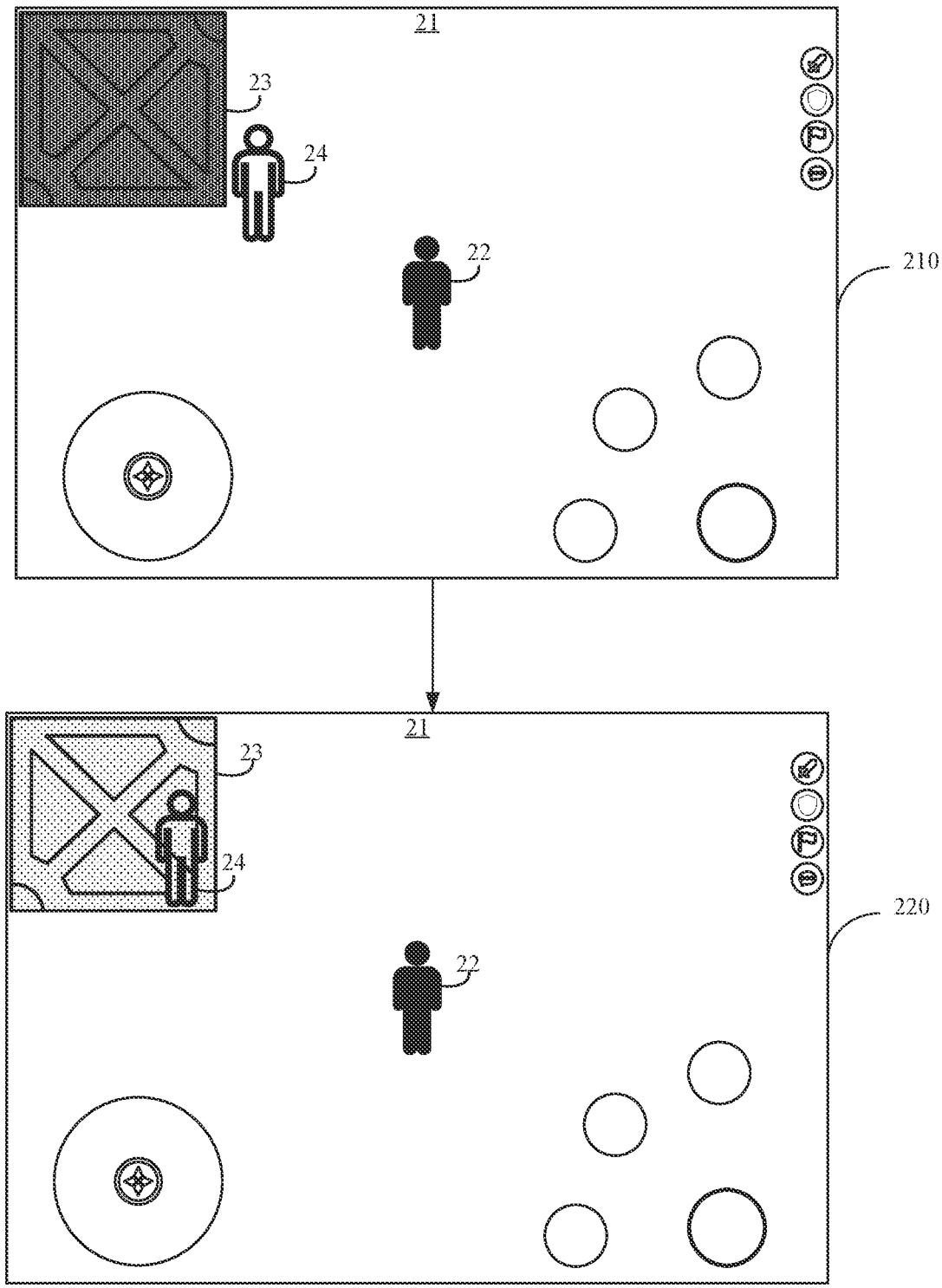
FIG. 1 is a schematic interface diagram of a control display method according to an exemplary embodiment of this application.

Terms appeared in the embodiments of this application are explained below:

A multiplayer online battle arena (MOBA) game is a game in which several forts are provided in a virtual scene, and users on different camps control virtual characters to battle in the virtual scene, to occupy forts or destroy the fort of the opposing camp. For example, the MOBA game may divide the users into at least two opposing camps, and different virtual teams respectively belonging to the at least two opposing camps occupy respective map regions, and compete against each other using specific victory conditions as objectives. The victory condition includes, but is not limited to at least one of occupying a fort or destroying a fort of the opposing camp, killing virtual characters in the opposing camp, ensuring own survival in a specified scene and time, seizing a specific resource, or outscoring the opponent within a specified time. For example, in the MOBA game, the users may be divided into two opposing camps. The virtual characters controlled by the users are scattered in the virtual scene to compete against each other, and the victory condition is to destroy or occupy all opponent forts.

In some embodiments, each virtual team includes one or more virtual characters, such as 1, 2, 3, or 5. According to a quantity of virtual characters in each team participating in the battle arena, the battle arena may be divided into 1V1 competition, 2V2 competition, 3V3 competition, 5V5 competition, and the like. 1V1 means "1 vs. 1", and details are not described herein. "A plurality of" means two and more than two.

In some embodiments, the MOBA game may take place in rounds (or turns), and each round of the battle arena may have the same map or different maps. A duration of a round of the MOBA game is from a time point at which the game starts to a time point at which the victory condition is met.

In the MOBA game, a user may control a virtual character to fall freely, glide, parachute, or the like in the sky of the virtual scene, or to run, jump, crawl, walk in a stooped posture, or the like on the land, or may control a virtual character to swim, float, dive, or the like in the ocean. Herein, the scenes are merely used as examples, and no specific limitations are set in the embodiments of this application.

In the MOBA game, users may also control virtual characters to cast skills, to fight with other virtual characters. For example, skill types of the skills may include an attack skill, a defense skill, a healing skill, an auxiliary skill, a beheading skill, and the like. Each virtual character may have one or more fixed skills, and different virtual characters generally have different skills, and different skills may produce different effects. For example, if an attack skill cast by a virtual character hits an opposing virtual character, certain damage is caused to the opposing virtual character, which is generally shown as deducting a part of virtual health points of the opposing virtual character. In another example, if a healing skill cast by a virtual character hits a friendly virtual character, certain healing is produced for the friendly virtual character, which is generally shown as restoring a part of virtual health points of the friendly virtual character, and all other types of skills may produce corresponding effects. Details are not described herein again.

A virtual environment is a virtual world displayed (or provided) by an application program when run on a terminal.

Exemplarily, the virtual world may be a simulated world of a real world, or may be a semi-simulated semi-fictional three-dimensional world, or may be an entirely fictional three-dimensional world.

Exemplarily, the virtual world may be any one of a two-dimensional virtual world, a 2.5-dimensional virtual world, or a three-dimensional virtual world.

In some embodiments, the virtual world is further used for providing a scene for a battle between at least two virtual characters, and virtual resources available to the at least two virtual characters are provided in the virtual world.

A virtual character is a movable object in the virtual world. The movable object may be at least one of a virtual person, a virtual animal, and a cartoon person. In some embodiments, when a virtual world is a three-dimensional virtual world, the virtual characters may be three-dimensional models. Each virtual character has a shape and a volume in the three-dimensional virtual world, and occupies some space in the three-dimensional virtual world. In some embodiments, the virtual character is a three-dimensional character constructed based on three-dimensional human skeleton technology. The virtual character wears different skins to implement different appearances. In some implementations, the virtual character may be alternatively implemented by using a 2.5-dimensional model or a two-dimensional model. This is not limited in the embodiments of this application.

A UI control is superimposed on an upper layer of a virtual world picture for display. Display content in the virtual world picture constantly changes, but a display position of the UI control on a GUI is relatively fixed. Therefore, a display position of a virtual character may be blocked by the UI control when the virtual character moves, so that the virtual character is blocked by the UI control when being in the display position, and a user cannot observe the blocked virtual character. In view of this, this application provides a control display method, to control transparency change of a control based on a blocking relationship between a display position of a virtual character and a region in which the control is located, so that the user can observe the virtual character blocked by the control.

FIG. 1 is a schematic interface diagram of a control display method according to an exemplary embodiment of this application. This embodiment uses a battle interface of a MOBA game as an example. As shown in a GUI 210, a black person in a center of the interface is a friendly virtual character 22, a white person in the interface is an opponent virtual character 24, and a dot-filled box in an upper left corner of the interface is a minimap 23 displayed on the UI. In this case, a transparency of the minimap 23 is 0%. As shown in a GUI 220, when the opponent virtual character 24 moves to the upper left box region and is blocked by the minimap 23, the transparency of the minimap 23 is adjusted to 50%. After the transparency of the minimap 23 is increased, the opponent virtual character 24 blocked by the minimap 23 may be observed by a user, so that the user can better grasp a battle situation. Transparency change of the minimap is reflected by a point density, and the point density is in a negative correlation with the transparency.

Figure 2:
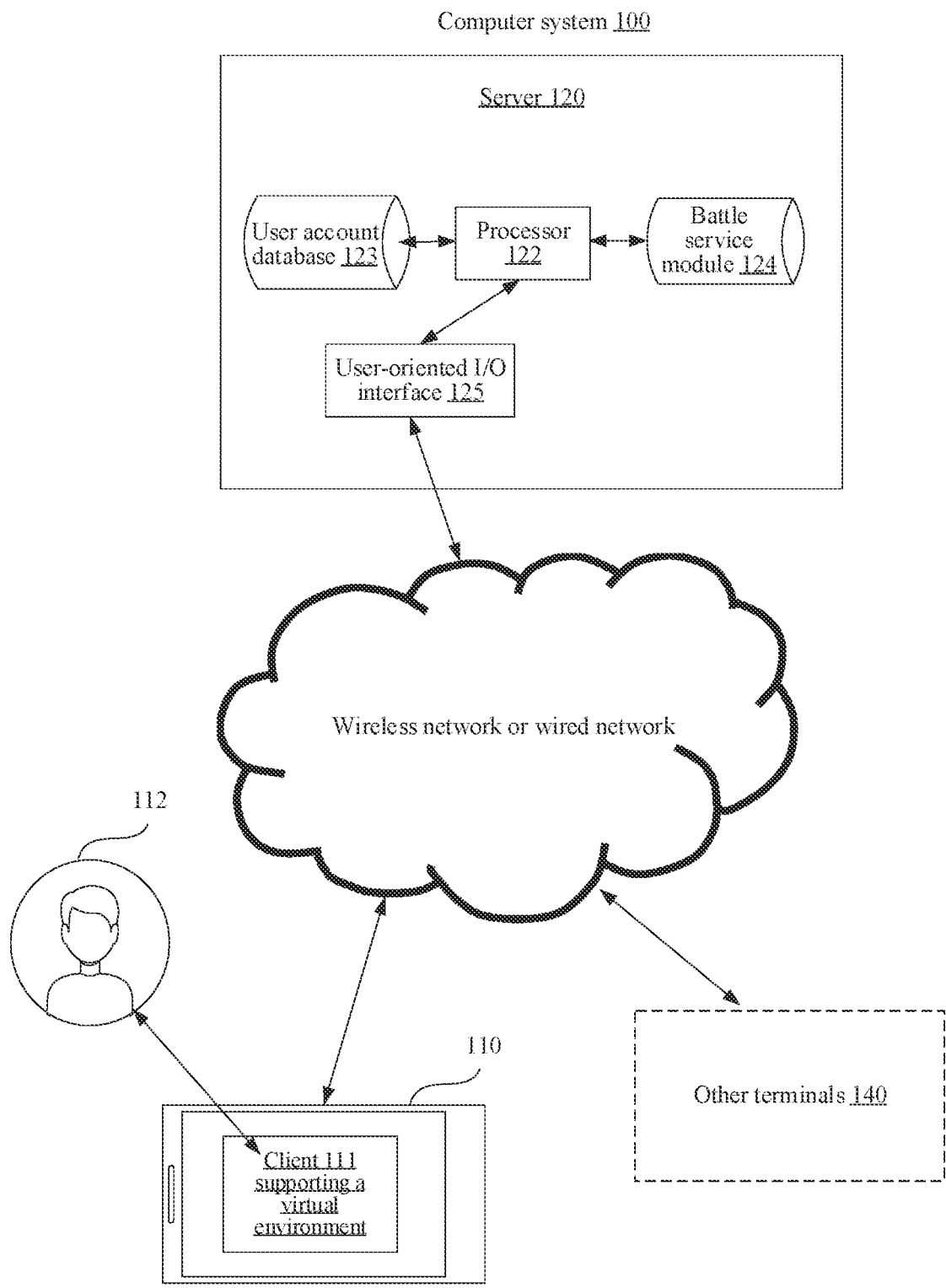
FIG. 2 is a structural block diagram of a computer system according to an exemplary embodiment of this application.

FIG. 2 is a structural block diagram of a computer system according to an exemplary embodiment of this application. The computer system 100 includes a terminal 110 and a server 120.

A client 111 supporting a virtual environment is installed and run on the terminal 110, and the client 111 may be a multiplayer online battle program. When the terminal runs the client 111, a UI of the client 111 is displayed on a screen of the terminal 110. The client may be any one of a military simulation program, an escape shooting game, a virtual reality (VR) application, an augmented reality (AR) program, a three-dimensional map program, a VR game, an AR game, a first-person shooting (FPS) game, a third-person shooting (TPS) game, a MOBA game, or a simulation game (SLG). In this embodiment, an example in which a client is a role-playing game is used for description. The terminal 110 is a terminal used by a user 112. The user 112 uses the terminal 110 to control a virtual character located in a virtual environment to move, and the virtual character may be referred to as a master virtual character of the user 112. The movements of the virtual character include, but are not limited to: at least one of adjusting body postures, crawling, walking, running, riding, jumping, driving, picking, shooting, attacking, and throwing. Exemplarily, the virtual character is a virtual person, for example, a simulated person character or a cartoon person character.

FIG. 2 shows only one terminal. However, a plurality of other terminals 140 may access the server 120 in different embodiments. In some embodiments, one or more terminals 140 are terminals corresponding to a developer. A development and editing platform for the client supporting a virtual environment is installed on the terminals 140. The developer may edit and update the client on the terminals 140 and transmit an updated client installation package to the server 120 through a wired or wireless network. The terminal 110 may download the client installation package from the server 120 to update the client.

The terminal 110 and the other terminals 140 are connected to the server 120 through a wireless network or a wired network.

The server 120 includes at least one of one server, a plurality of servers, a cloud computing platform, and a virtualization center. The server 120 is configured to provide a background service for a client supporting a three-dimensional virtual environment. In some embodiments, the server 120 is responsible for primary computing work, and the terminal is responsible for secondary computing work; or the server 120 is responsible for secondary computing work, and the terminal is responsible for primary computing work; or the server 120 and the terminal perform collaborative computing by using a distributed computing architecture between each other.

In a schematic example, the server 120 includes a processor 122, a user account database 123, a battle service module 124, and a user-oriented input/output (I/O) interface 125. The processor 122 is configured to load instructions stored in the server 120, and process data in the user account database 123 and the battle service module 124. The user account database 123 is configured to store data of user accounts used by the terminal 110 and the other terminals 140, for example, avatars of the user accounts, nicknames of the user accounts, battle effectiveness indexes of the user accounts, and service zones of the user accounts. The battle service module 124 is configured to provide a plurality of battle rooms, for example, a 1V1 battle room, a 3V3 battle room, a 5V5 battle room, for the users to battle. The user-oriented I/O interface 125 is configured to establish communication between the terminal 110 and/or the other terminals 140 through a wireless network or a wired network for data exchange.

Figure 3:
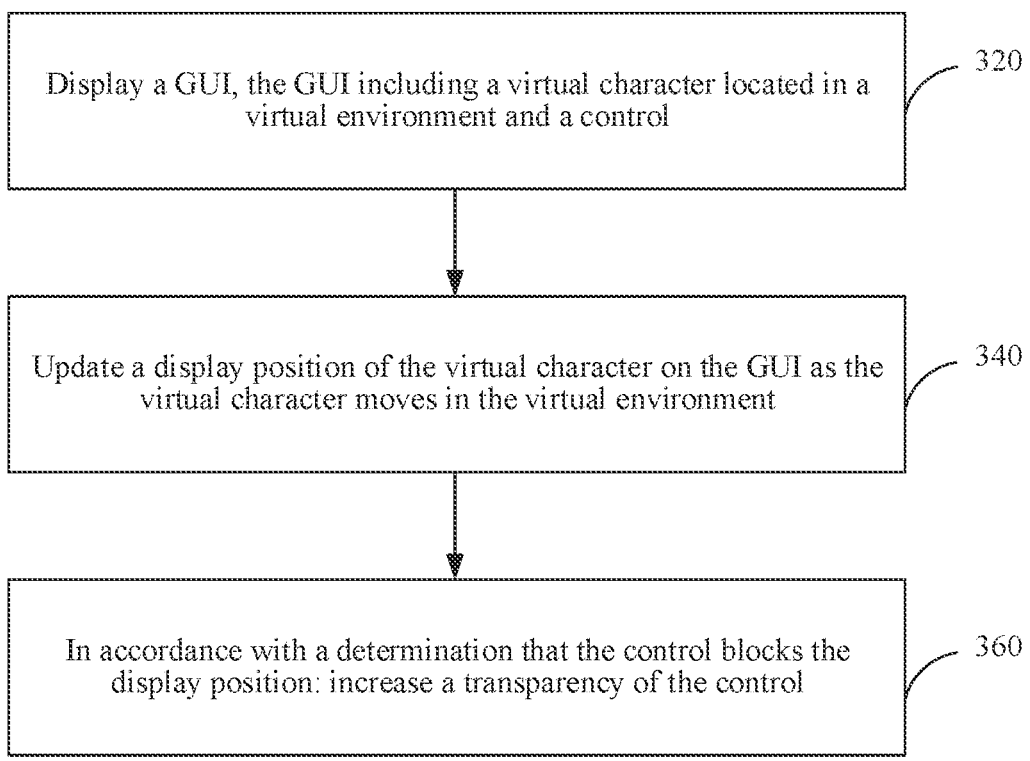
FIG. 3 is a flowchart of a control display method according to an exemplary embodiment of this application.

FIG. 3 is a flowchart of a control display method according to an exemplary embodiment of this application. Exemplarily, by using an example in which the method is performed by the terminal 110 (or the client in the terminal 110) shown in FIG. 2 for description, the method includes the following steps:

Step 320: Display a GUI, the GUI including a virtual character located in a virtual environment and a control.

The terminal displays a GUI of a currently running client. The GUI displays a virtual character located in a virtual environment and a control.

Exemplarily, the currently running client being a MOBA game is used as an example. The terminal displays a battle interface in the game. Virtual characters on the battle interface include a friendly virtual character, an opponent virtual character, a non-player virtual character, and the like. Controls on the battle interface include a minimap control, an attack control, a movement control, a menu control, and the like.

Exemplarily, the currently running client being an FPS game is used as an example. The terminal displays a picture of a perspective of a virtual character controlled by a current player. Virtual characters on the GUI include a friendly virtual character, an opponent virtual character, a non-player virtual character, and the like. Controls on the GUI include a minimap control, an aiming control, a shooting control, a running control, and the like.

Exemplarily, the currently running client being an automobile racing game is used as an example. The terminal displays a picture of a perspective of a virtual character controlled by a current player. Virtual characters on the GUI include a virtual character participating in a race, a virtual vehicle of the virtual character, and the like. Controls on the GUI include an acceleration control, a steering control, a brake control, and the like.

Step 340: Update a display position of the virtual character on the GUI as the virtual character moves in the virtual environment.

The virtual character moves in the virtual environment, and therefore the terminal needs to constantly obtain a spatial position of the virtual character in the virtual environment, and convert the spatial position in the three-dimensional virtual environment into the display position on the two-dimensional GUI, to update the display position of the virtual character on the GUI.

A frequency at which the terminal updates the display position of the virtual character on the GUI may be preset, for example, the update may be performed once every one frame, or once every two frames. A higher update frequency indicates more smooth movement of the virtual character displayed on the GUI.

Exemplarily, the terminal controls the virtual character to move in the virtual environment in response to a movement operation of a user for the virtual character or in response to development of a related scenario. The terminal obtains the display position of the virtual character on the GUI by projecting every frame of the obtained spatial position of the virtual character in the virtual environment, to update the display position of the virtual character on the GUI.

Exemplarily, during the process of converting the spatial position of the virtual character into the display position, the terminal selects at least one target point on the virtual character; converts three-dimensional coordinates of the at least one target point into two-dimensional coordinates on the GUI based on a conversion matrix; and represents the display position of the virtual character on the GUI through the two-dimensional coordinates of the at least one target point.

Step 360: Increase a transparency of the control in accordance with a determination that the control blocks the display position.

The terminal updates the display position of the virtual character on the GUI, and determines a blocking relationship between the display position and a position of the control on the GUI. In accordance with a determination that the control blocks the display position of the virtual character on the GUI, a first transparency of the control is increased to a second transparency, that is, the transparency of the control is increased from the first transparency to the second transparency.

Exemplarily, there are a plurality of manners for amplitude selection on the second transparency (namely, the increased transparency of the control). The amplitude of the second transparency is preset as a fixed value, for example, 50%, 60%, or 75%; or the second transparency is in a positive correlation with a blocking degree of the control to the display position, that is, a greater blocking degree of the control to the display position indicates a greater second transparency. Exemplarily, the blocking degree refers to a size of a display area of the virtual character blocked by the control on the GUI. that is, the blocking degree is used for indicating a size of a blocked area of the virtual character on the GUI. The blocked area of the virtual character is in a positive correlation with the blocking degree, and a greater display area of the virtual character blocked by the control indicates a greater blocking degree. Exemplarily, the size degree of the blocked area of the virtual character may be represented based on an absolute value of the blocked area; or may be represented based on a proportion of the blocked area to a total area, where the total area refers to a total display area occupied by the virtual character on the GUI; or may be represented based on a quantity of blocked target points, where the target points are points selected on the virtual character, and the target points are used for indicating the position of the virtual character.

In some embodiments, to ensure that the user can observe the virtual character blocked by the control more conveniently, in addition to increasing the transparency of the control, a highlight effect may also be increased for the virtual character blocked by the control. For example, a contour of the virtual character is bolded; or color filling of the virtual character is darkened; or the virtual character is highlighted.

Exemplarily, the client presets an implementation of changing the transparency of the control, or the user customizes an implementation of changing the transparency of the control. The transparency of the control may be suddenly changed; or the transparency of the control may be gradually changed.

For example, if the client presets the transparency change of the control to a sudden change effect, the terminal suddenly changes the transparency of the control from the first transparency to the second transparency in accordance with a determination that the control blocks the display position. In another example, if the user sets a time required by a transparency gradual change process of the control as s s (for example, 0.5 s), the terminal gradually increases the transparency of the control from the first transparency to the second transparency in s seconds in accordance with a determination that the control blocks the display position, s being a positive integer. The first transparency is lower than the second transparency.

The "sudden change" is a change in switching from one transparency to another transparency within a specified period of time. Correspondingly, the terminal suddenly changes the first transparency of the control to the second transparency, that is, directly switches the first transparency of the control to the second transparency within a specified period of time, and there is no transparency gradual change process between the first transparency and the second transparency. For example, the terminal determines that the control blocks the display position, and switches the first transparency of the control to the second transparency within 0.05 s from the determining time.

The implementations of the amplitude selection on the second transparency and the transparency change of the control are not limited in this application.

In conclusion, in the control display method provided in this embodiment, a GUI is displayed, and a display position of a virtual character on the GUI is updated, to obtain a blocking relationship between a region in which a control is located and the display position of the virtual character; and a transparency of the control is increased in accordance with a determination that the control blocks the display position, to make the control transparent. In this way, a user can observe the virtual character blocked by the control, and the transparency of the control is changed in real time as the blocking relationship between the control and the virtual character, which can better attract the user's attention.

Figure 4:
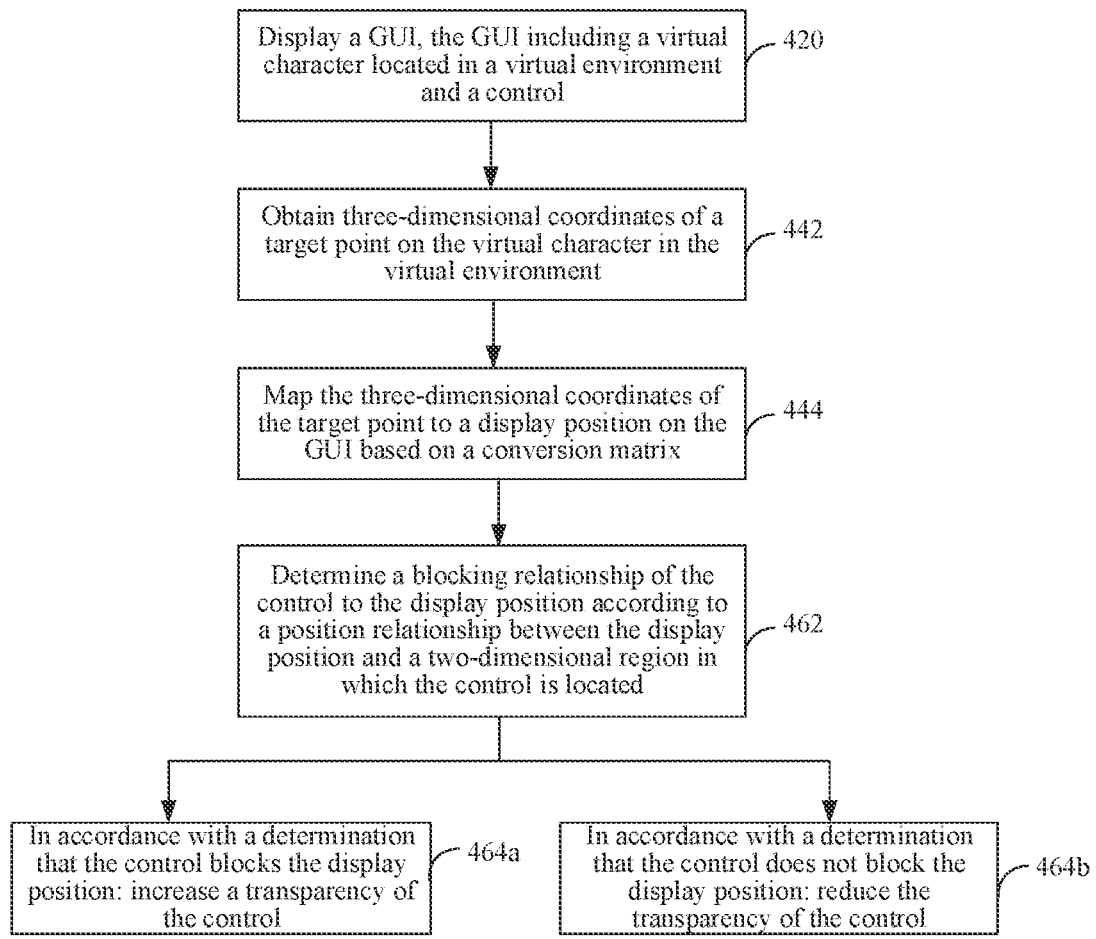
FIG. 4 is a flowchart of a control display method according to another exemplary embodiment of this application.

FIG. 4 is a flowchart of a control display method according to an exemplary embodiment of this application. Exemplarily, by using an example in which the method is performed by the terminal 110 (or the client in the terminal 110) shown in FIG. 2 for description, the method includes the following steps:

Step 420: Display a GUI, the GUI including a virtual character located in a virtual environment and a control.

For a detailed implementation of step 420, refer to step 320, and details are not described herein again.

Step 442: Obtain three-dimensional coordinates of a target point on the virtual character in the virtual environment.

The terminal selects a target point on the virtual character, and the target point is used for indicating a position of the virtual character. The target point is further used for determining a blocking relationship between the virtual character and the control together with a region in which the control is located.

The terminal obtains three-dimensional coordinates of the target point on the virtual character in the virtual environment. There are several options for a quantity of selected target points, for example, 1, 3, or 4. More selected target points represent a more accurate position of the virtual character, but more consumed computing resources.

There are several options for a position selected for the target point, for example, a head of the virtual character is selected as the target point: or a first connection line between the head and feet of the virtual character is determined, a second connection line between a left hand and a right hand of the virtual character is determined, and an intersection of the first connection line and the second connection line is selected as the target point; or several points on a contour of the virtual character are selected as target points.

The quantity and the positions of the target points selected on the virtual character are not limited in this application.

Exemplarily, the terminal selects three target points on the virtual character, which are respectively a head vertex of the virtual character, a foot bottom point obtained by taking a middle point of a foot bottom connection line between two feet, and a body middle point obtained by taking a middle point of a connection line between the head vertex and the foot bottom point; and obtains three-dimensional coordinates of the three target points in the virtual environment.

Exemplarily, the terminal selects two target points on the virtual character, which are respectively a left hand point and a right hand point of the virtual character; and obtains three-dimensional coordinates of the two target points in the virtual environment.

Step 444: Map the three-dimensional coordinates of the target point to the display position on the GUI based on a conversion matrix.

After obtaining the three-dimensional coordinates of the target point in the virtual environment, the terminal maps the three-dimensional coordinates of the target point to the display position of the virtual character on the GUI based on the conversion matrix.

Exemplarily, in accordance with a determination that the terminal maps the three-dimensional coordinates in the virtual environment to two-dimensional coordinates on the GUI, the conversion matrix shown in the following formula may be used:

$$Z_c \begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ \vec{0} & 1 \end{bmatrix}$$

$$\begin{bmatrix} X_w \\ Y_w \\ Z_w \\ 1 \end{bmatrix} = \begin{bmatrix} f_x & 0 & u_0 & 0 \\ 0 & f_y & v_0 & 0 \\ 0 & 0 & 1 & 0 \end{bmatrix} \begin{bmatrix} R & T \\ \vec{0} & 1 \end{bmatrix} \begin{bmatrix} X_w \\ Y_w \\ Z_w \\ 1 \end{bmatrix} \begin{bmatrix} f_x & 0 & u_0 & 0 \\ 0 & f_y & v_0 & 0 \\ 0 & 0 & 1 & 0 \end{bmatrix}$$

is an intrinsic matrix of a camera, $f_x$ represents a focal length of the camera in an x-axis direction, $f_y$ represents a focal length of the camera in a y-axis direction, and $u_0$ and $v_0$ are aperture centers of the camera.

$$\begin{bmatrix} R & T \\ \vec{0} & 1 \end{bmatrix}$$

is an extrinsic matrix of the camera. R represents a rotation matrix, and T represents an offset vector.

$X_w$, $Y_w$, and $Z_w$ represent coordinates of a target point on the virtual character on the x-axis, y-axis, and z-axis in the virtual environment respectively, u and v represent coordinates of the target point on the u-axis and v-axis in the two-dimensional GUI respectively, $Z_c$ represents a coordinate value of the target point on the z axis in a camera coordinate system of the virtual environment, and f is a focal length of the camera.

Step 462: Determine a blocking relationship of the control to the display position according to a position relationship between the display position and a two-dimensional region in which the control is located.

The display position of the virtual character on the two-dimensional GUI is obtained through the foregoing steps, and the terminal determines the blocking relationship of the control to the display position according to the position relationship between the display position and the two-dimensional region in which the control is located.

Exemplarily, for each target point on the virtual character, the terminal determines whether a position of the target point on the GUI is located in the two-dimensional region in which the control is located. If any one of the target points on the virtual character is located in the two-dimensional region in which the control is located, the terminal determines that the control blocks the display position; and if neither of the target points on the virtual character is located in the two-dimensional region in which the control is located, the terminal determines that the control does not block the display position.

In some embodiments, the terminal selects a first plurality of target points (e.g., n target points) on the virtual character, and n is an integer greater than 1. In accordance with a determination that a second plurality of target points (e.g., i target points) of the first plurality of target points (e.g., n target points) on the virtual character are located in the two-dimensional region in which the control is located, the terminal determines that the control has the blocking relationship to the display position, i being a positive integer less than or equal to n.

Exemplarily, the terminal selects three target points on the virtual character, which are respectively a head vertex of the virtual character, a foot bottom point obtained by taking a middle point of a foot bottom connection line between two feet, and a body middle point obtained by taking a middle point of a connection line between the head vertex and the foot bottom point. The terminal determines whether the three target points are located in the two-dimensional region in which the control is located; if neither of the three target points on the virtual character is located in the two-dimensional region in which the control is located, determines that the control does not block the display position; and if at least one of the three target points on the virtual character is located in the two-dimensional region in which the control is located, determines that the control blocks the display position.

In some embodiments, in accordance with a determination that the second plurality of target points (e.g., i target points) of the first plurality of target points (e.g., n target points) on the virtual character are located in the two-dimensional region in which the control is located, the terminal determines that the control has a corresponding (e.g., an $i^{th}$-level) blocking relationship to the display position. Exemplarily, in accordance with a determination that one of the three target points is located in the two-dimensional region in which the control is located, for example, the head vertex is located in the two-dimensional region in which the control is located, the terminal determines that the control has a first-level blocking relationship to the display position; in accordance with a determination that two of the three target points are located in the two-dimensional region in which the control is located, for example, the head vertex and the body middle point are located in the two-dimensional region in which the control is located, the terminal determines that the control has a second-level blocking relationship to the display position; and in accordance with a determination that all the three target points are located in the two-dimensional region in which the control is located, the terminal determines that the control has a third-level blocking relationship to the display position.

Step 464*a*: Increase a transparency of the control in accordance with a determination that the control blocks the display position.

In accordance with a determination that the control blocks the display position, the terminal increases the transparency of the control from a first transparency to a second transparency, where the first transparency is lower than the second transparency, and a greater transparency indicates a more transparent control.

There are a plurality of manners for size selection on the second transparency. The second transparency is preset as a fixed value, for example, 50%, 60%, or 75%. In accordance with a determination that the control blocks the display position of the virtual character, the terminal increases the transparency to the fixed value.

Alternatively, the second transparency is in a positive correlation with a blocking degree of the control to the display position, that is, a higher blocking degree of the control to the display position indicates a greater second transparency. Exemplarily, the terminal sets the second transparency as 20% in accordance with a determination that blocking of the control to the display position is less than or equal to ⅓ of the display position of the virtual character; sets the second transparency as 40% in accordance with a determination that the blocking of the control to the display position is greater than ⅓ of the display position of the virtual character and is less than ⅔ of the display position of the virtual character; and sets the second transparency as 60% in accordance with a determination that the blocking of the control to the display position is greater than or equal to ⅔ of the display position of the virtual character.

In some embodiments, a correspondence between the $i^{th}$-level blocking relationship and $i^{th}$-level transparency is preset. The terminal queries the $i^{th}$-level transparency corresponding to the $i^{th}$-level blocking relationship in the correspondence, the correspondence including correspondences between different blocking relationships and different transparencies; and determines the $i^{th}$-level transparency as the second transparency. Then, the terminal increases the first transparency to the second transparency.

Exemplarily, the terminal selects three target points on the virtual character, which are respectively a head vertex of the virtual character, a foot bottom point obtained by taking a middle point of a foot bottom connection line between two feet, and a body middle point obtained by taking a middle point of a connection line between the head vertex and the foot bottom point. The correspondence between the blocking relationship and the transparency is set as shown in the following table:

| Blocking relationship | Transparency |
|---|---|
| First-level blocking relationship | 25% |
| Second-level blocking relationship | 50% |
| Third-level blocking relationship | 75% |

In accordance with a determination that one of the three target points is located in the two-dimensional region in which the control is located, the terminal determines that the control has the first-level blocking relationship to the display position, and determines the second transparency as 25% after querying the correspondence between the blocking relationship and the transparency; in accordance with a determination that two of the three target points are located in the two-dimensional region in which the control is located, the terminal determines that the control has the second-level blocking relationship to the display position, and determines the second transparency as 50% after querying the correspondence between the blocking relationship and the transparency; and in accordance with a determination that all the three target points are located in the two-dimensional region in which the control is located, the terminal determines that the control has the third-level blocking relationship to the display position, and determines the second transparency as 75% after querying the correspondence between the blocking relationship and the transparency.

The terminal may suddenly or gradually increase the transparency of the control from the first transparency to the second transparency. A develop and a user of the client may set a sudden change effect; or set no sudden change effect, and select to set a process time of gradual change of the transparency, for example, 0.5 s or 1 s.

The amplitude of the transparency of the control and the change process of the transparency are not limited in this application.

In some embodiments, to ensure that the user can observe the virtual character blocked by the control more conveniently, in addition to increasing the transparency of the control, a highlight effect may also be increased for the virtual character blocked by the control. For example, a contour of the virtual character is bolded; or color filling of the virtual character is darkened: or the virtual character is highlighted.

Step 464b: Reduce the transparency of the control in accordance with a determination that the control does not block the display position.

After increasing the transparency of the control from the initial first transparency to the second transparency, the terminal monitors a blocking situation of the control to the virtual character in real time. In accordance with a determination that the control does not block the display position of the virtual character, there is no need to increase the transparency to make the virtual character visible. Therefore, the transparency of the control is recovered to the initial first transparency.

Exemplarily, in accordance with a determination that neither of the target points on the virtual character is located in the two-dimensional region in which the control is located, the terminal determines that the control does not block the display position, and reduces the transparency of the control to the first transparency.

The amplitude of the first transparency is a preset initial transparency value, for example, 0%, 5%, or 10%. The amplitude of the first transparency is not limited in this application.

The terminal may suddenly or gradually reduce the transparency of the control from the second transparency to the first transparency. A develop and a user of the client may set a sudden change effect. Exemplarily, the terminal suddenly changes the transparency of the control from the second transparency to the first transparency in accordance with a determination that the control does not block the display position. Alternatively, no sudden change effect is set, and a process time of gradual change of the transparency is selected to be set, for example, 0.5 s, or 1 s. Exemplarily, the terminal gradually reduces the transparency of the control from the second transparency to the first transparency in accordance with a determination that the control does not block the display position.

Exemplarily, the terminal selects a first plurality of target points (e.g., n target points) on the virtual character: determines, in accordance with a determination that a second plurality of target points (e.g., i target points) of the first plurality of target points (e.g., n target points) on the virtual character is located in the two-dimensional region in which the control is located, that the control has a corresponding level (e.g., $i^{th}$-level) blocking relationship to the display position; queries an $i^{th}$-level transparency corresponding to the $i^{th}$-level blocking relationship in a correspondence: determines the $i^{th}$-level transparency as a middle transparency; reduces the transparency of the control from the second transparency to the middle transparency; and reduces the transparency of the control to the initial first transparency in accordance with a determination that no target points are located in the two-dimensional region in which the control is located.

There is another case that the transparency of the control on the terminal is the initial first transparency, and a blocking situation of the control to the virtual character is monitored in real time. In accordance with a determination that the control does not block the display position of the virtual character, there is no need to increase the transparency to make the virtual character visible. Therefore, the transparency of the control is not changed.

Figure 5:
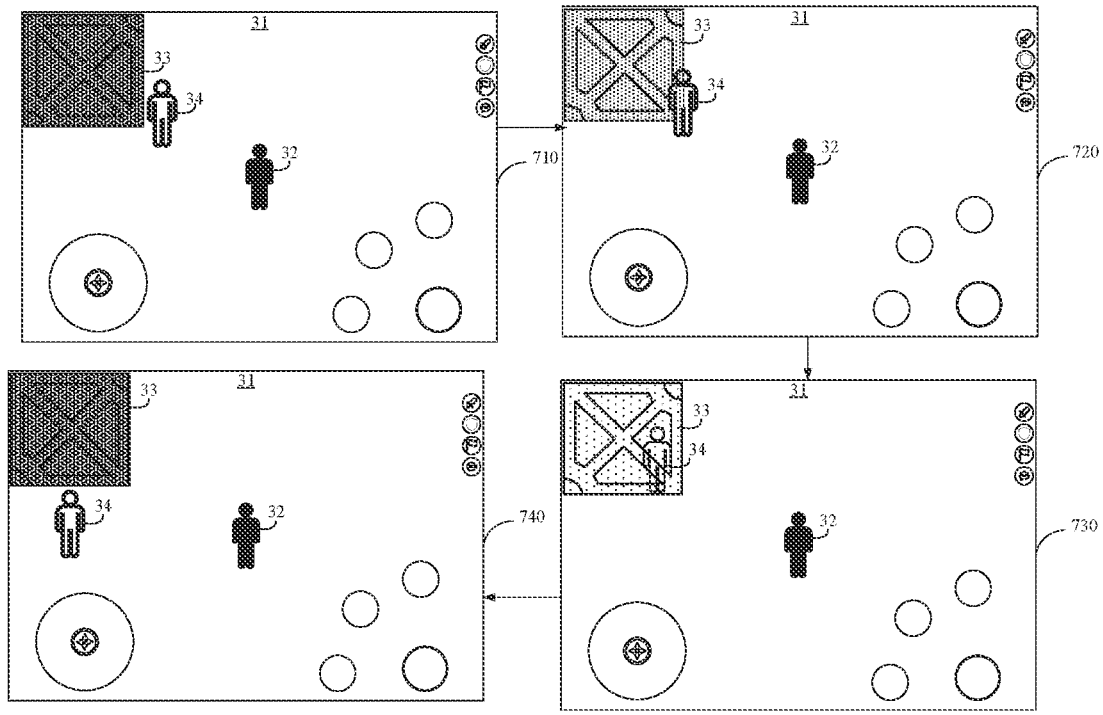
FIG. 5 is a schematic interface diagram of a control display method according to an exemplary embodiment of this application.

Exemplarily, as shown in FIG. 5, the terminal selects two target points on the virtual character, which are respectively a left hand point and a right hand point of the virtual character. The first transparency is preset as 0%, a first-level transparency corresponding to first-level blocking is 50%, and a second-level transparency corresponding to second-level blocking is 80%. GUIs 710 to 740 are respectively GUIs respectively acquired at four time points with a short time interval. In a position relationship shown in the GUI 710 in an upper left corner, a control 33 does not block a virtual character 34, and a transparency of the control 33 is 0%; in a position relationship shown in the GUI 720 in an upper right corner, the control 33 has the first-level blocking to the virtual character 34, and the transparency of the control 33 is increased to a second transparency 50%; in a position relationship shown in the GUI 730 in a lower right corner, the control 33 has the second-level blocking to the virtual character 34, and the transparency of the control 33 is increased to a second transparency 80%; in a position relationship shown in the GUI 740 in a lower left corner, the control 33 does not block the virtual character 34, and the transparency of the control 33 is reduced to the first transparency 0%.

Figure 6:
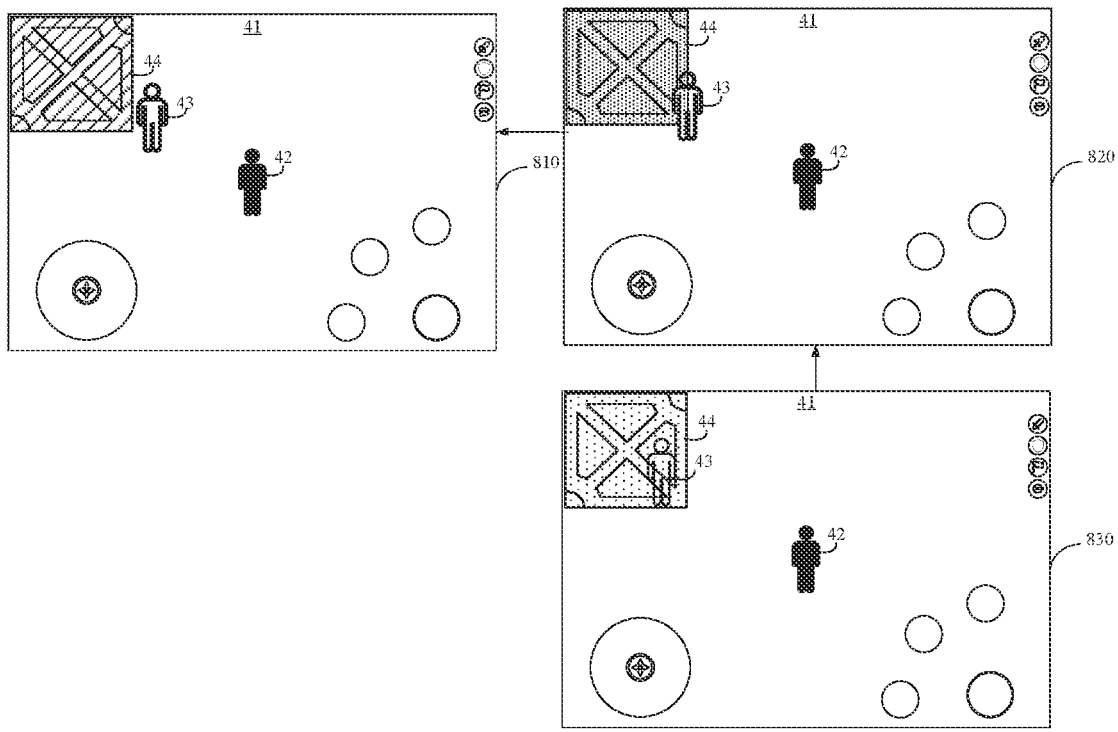
FIG. 6 is a schematic interface diagram of a control display method according to another exemplary embodiment of this application.

Exemplarily, as shown in FIG. 6, the terminal selects two target points on the virtual character, which are respectively a left hand point and a right hand point of the virtual character. The first transparency is preset as 0%, a first-level transparency corresponding to first-level blocking is 50%, and a second-level transparency corresponding to second-level blocking is 80%. GUIs 830 to 810 are respectively GUIs respectively acquired at three time points with a short time interval. In a position relationship shown in the GUI 830 in a lower right corner, a control 44 has the second-level blocking to the virtual character 43, and a transparency of the control 44 is a second transparency 80%; in a position relationship shown in the GUI 820 in an upper right corner, the control 44 has the first-level blocking to the virtual character 43, and the transparency of the control 44 is reduced to a middle transparency 50%; and in a position relationship shown in the GUI 810 in a lower left corner, the control 44 does not block the virtual character 43, and the transparency of the control 44 is reduced to the first transparency 0%.

In some embodiments, after increasing the transparency of the control, the terminal further reduces the transparency of the control in response to an approaching operation triggered by a hover gesture (e.g., on a suspended position) above the control. That is, after increasing the transparency of the control, the terminal detects that a finger approaches above the control, which indicates that the user is about to use the control; and reduces the transparency of the control from the second transparency to a third transparency, so that the user can observe the control more clearly.

The terminal may suddenly or gradually reduce the transparency of the control from the second transparency to the third transparency. Exemplarily, the third transparency is changed with a vertical distance between the figure and the screen, and the third transparency is in a positive correlation with the vertical distance. The terminal determines the vertical distance between the figure and the screen, and determines the third transparency based on a mapping relationship between the vertical distance and the transparency. Exemplarily, the third transparency may include the first transparency.

In conclusion, in the control display method provided in this embodiment, a GUI is displayed, three-dimensional coordinates of a target point on a virtual character are mapped to a display position on the GUI, and a transparency of a control is changed according to a position relationship between the display position and a two-dimensional region in which the control is located. The method provides a control display method in which a user can observe a virtual character blocked by a control. In addition, in the method, at least one target point on the virtual character is selected, and three-dimensional coordinates of the target point are converted into two-dimensional coordinates, to indicate a display position of the virtual character on the GUI, thereby avoiding projection calculation on an entire contour of the virtual character, and saving computing resources. In the method, selection of a second transparency is in a positive correlation with a blocking degree of the control to the display position, and for a control that blocks the display position in a great degree, a greater transparency is selected, so that the user can better observe a character in a great blocking degree, and the user's attention is drawn to movement of the blocked virtual character through the dynamic change of the transparency of the control.

Figure 7:
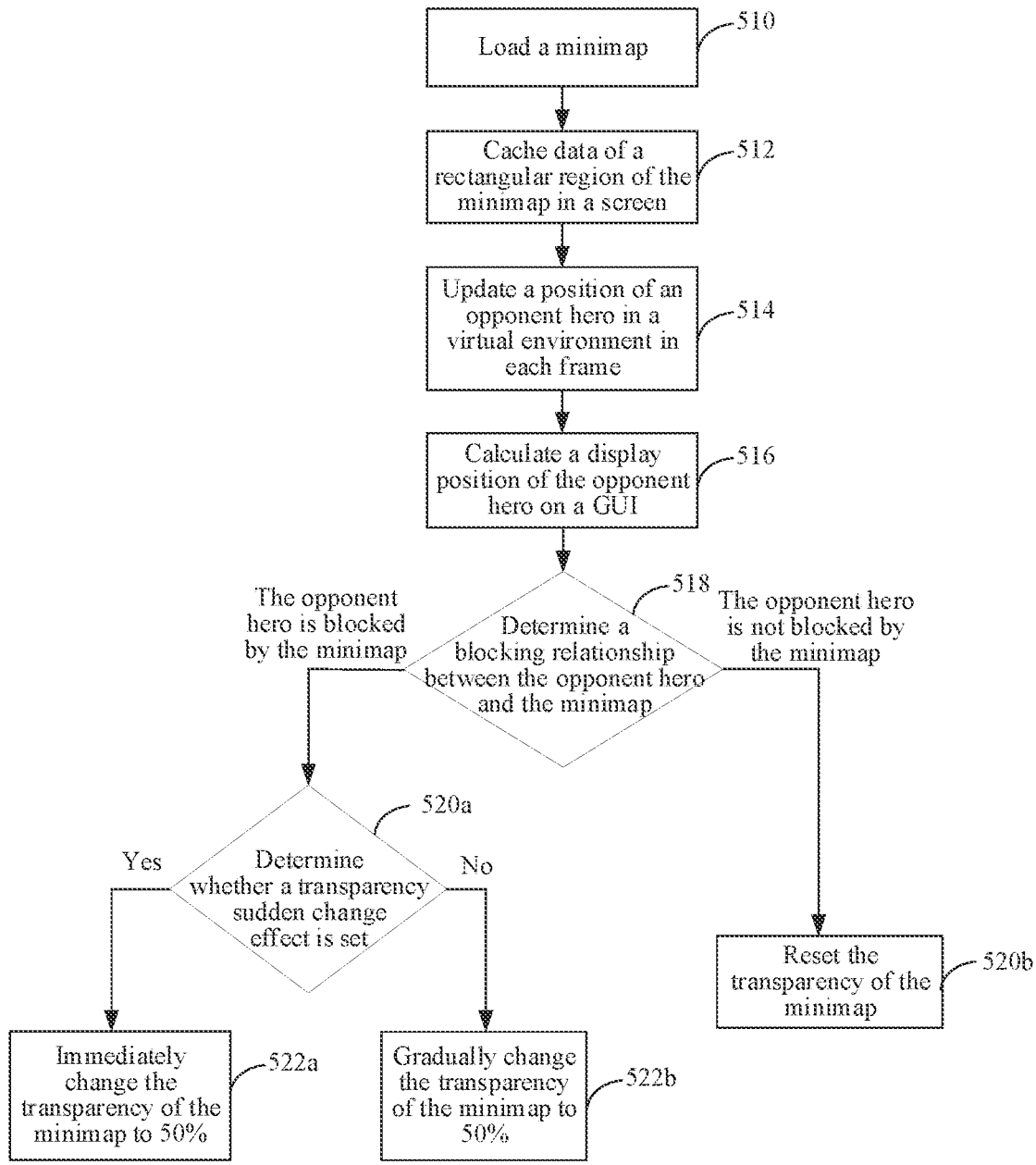
FIG. 7 is a flowchart of a control display method according to another exemplary embodiment of this application.

FIG. 7 is a flowchart of a control display method according to an exemplary embodiment of this application. In this embodiment, an example in which a battle interface of a MOBA game is used as a GUI, a minimap as a control, and an opponent hero as a virtual character, and an example in which a second transparency is set as 50% are used to display an execution process of the control display method. By using an example in which the method is performed by the terminal 110 (or the client in the terminal 110) shown in FIG. 2 for description, the method includes the following steps:

Step 510: Load a minimap.

The terminal displays a battle interface of the game, and loads the minimap in the battle interface. As shown in the GUI of FIG. 1, the minimap is displayed in an upper left corner of the battle interface.

Step 512: Cache data of a rectangular region of the minimap in a screen.

The terminal caches data of a position of a two-dimensional rectangular region in which the minimap is located. Exemplarily, the terminal caches position coordinates of a lower left point and an upper right point of the minimap; and obtains the position of the two-dimensional rectangular region in which the minimap is located based on the position coordinates of the two points.

Step 514: Update a position of an opponent hero in a virtual environment in every frame.

Because the opponent hero constantly moves in the virtual environment, the terminal needs to obtain the position of the opponent hero in the virtual environment according to an update frequency of each frame.

Exemplarily, the terminal selects three target points on the opponent hero, which are respectively a head vertex of the opponent hero, a foot bottom point obtained by taking a middle point of a foot bottom connection line between two feet, and a body middle point obtained by taking a middle point of a connection line between the head vertex and the foot bottom point. The terminal obtains three-dimensional coordinates of the three target points in the virtual environment according to the update frequency of each frame.

Step 516: Calculate a display position of the opponent hero on a GUI.

The terminal converts the obtained position of the opponent hero in the virtual environment into the display position of the opponent hero on the GUI.

Exemplarily, the terminal maps the three-dimensional coordinates of the three target points on the opponent hero to two-dimensional coordinates on the GUI, and uses the two-dimensional coordinates of the three target points to indicate the display position of the opponent hero on the GUI.

Step 518: Determine a blocking relationship between the opponent hero and the minimap.

The terminal determines the two-dimensional coordinates of the target points on the opponent hero and the two-dimensional region in which the minimap is located one by one; determines that the opponent hero is blocked by the minimap in accordance with a determination that any one of the target points on the opponent hero is located in the two-dimensional region in which the minimap is located; and determines that the opponent hero is not blocked by the minimap in accordance with a determination that neither of the target points on the opponent hero is located in the two-dimensional region in which the minimap is located.

If the opponent hero is blocked by the minimap, step 520*a* is performed; and if the opponent hero is not blocked by the minimap, step 520*b* is performed.

Step 520*a*: Determine whether a transparency sudden change effect is set.

If the opponent hero is blocked by the minimap, the terminal increases a transparency of the minimap to a second transparency 50%. Exemplarily, the terminal determines whether the transparency sudden change effect is set. If the transparency sudden change effect is set, step 522*a* is performed; and if the transparency sudden change effect is not set, step 522*b* is performed.

In some embodiments, in addition to increasing the transparency of the minimap, to ensure that the user can observe the virtual character blocked by the control more conveniently, the terminal may further increase a highlight effect to the opponent hero blocked by the control, for example, bold a contour of the opponent hero; or darken color filling of the opponent hero.

Step 520*b*: Reset the transparency of the minimap.

If the opponent hero is not blocked by the minimap, the terminal resets the transparency of the minimap to an initial value. The initial value is a preset transparency of the control, and may be 0%, 5%, or 10%.

Step 522*a*: Immediately change the transparency of the minimap to 50%.

In accordance with a determination that the opponent hero is blocked by the minimap and the transparency sudden change effect is set, the terminal immediately changes the transparency of the minimap to 50%.

Step 522*b*: Gradually change the transparency of the minimap to 50%.

In accordance with a determination that the opponent hero is blocked by the minimap and the transparency sudden change effect is not set, the terminal gradually changes the transparency of the minimap to 50%. According to a preset transparency gradual change time, a transparency gradual change process may be 0.5 s, 0.8 s, 1 s, or the like.

In conclusion, in the control display method provided in this embodiment, data of a position of a minimap is cached, to determine a blocking relationship between the position of the minimap and positions of target points on an opponent hero updated every frame; a transparency of the minimap is reset to an initial value in accordance with a determination that it is determined that neither of the target points on the opponent hero is not located in a position region of the minimap; and the transparency of the minimap is increased to a second transparency in accordance with a determination that it is determined that any target point on the opponent hero is located in the position region of the minimap. This embodiment provides a control display method, so that a blocked virtual character is visible; and a position of the virtual character is indicated through a target point on the virtual character, thereby saving computing resources The following is an apparatus embodiment of this application, which can be used to perform the method embodiments of this application. For details not disclosed in the apparatus embodiments of this application, refer to the method embodiments of this application.

Figure 8:
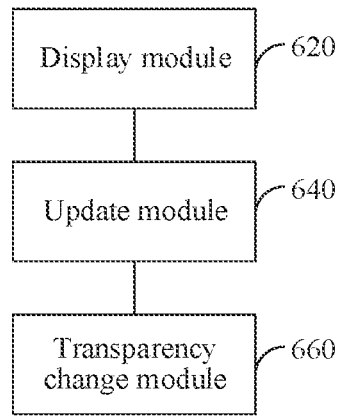
FIG. 8 is a structural block diagram of an apparatus for control display according to an exemplary embodiment of this application.

FIG. 8 is a structural block diagram of a control display apparatus according to an exemplary embodiment of this application. The apparatus includes:

a display module 620, configured to display a GUI, the GUI including a virtual character located in a virtual environment and a control;

an update module 640, configured to update a display position of the virtual character on the GUI as the virtual character moves in the virtual environment; and a transparency change module 660, configured to increase a transparency of the control in accordance with a determination that the control blocks the display position.

In a possible design, the transparency change module 660 is configured to suddenly change the transparency of the control from a first transparency to a second transparency in accordance with a determination that the control blocks the display position, the first transparency being lower than the second transparency; or the transparency change module 660 is configured to gradually increase the transparency of the control from a first transparency to a second transparency in accordance with a determination that the control blocks the display position, the first transparency being lower than the second transparency.

In a possible design, the increased transparency of the control is in a positive correlation with a blocking degree of the control to the display position; and the blocking degree is used for indicating a size degree of a blocked area of the virtual character on the GUI.

In a possible design, the update module 640 is configured to obtain three-dimensional coordinates of a target point on the virtual character in the virtual environment; the update module 640 is configured to map the three-dimensional coordinates of the target point to the display position on the GUI based on a conversion matrix; and the transparency change module 660 is configured to determine a blocking relationship of the control to the display position according to a position relationship between the display position and a two-dimensional region in which the control is located.

In a possible design, there is a first plurality (e.g., n target points, and n is an integer greater than or equal to 1) of target points; and the transparency change module 660 is configured to determine, in accordance with a determination that a second plurality (e.g., i target points) of target points of the first plurality of target points (n target points) on the virtual character are located in the two-dimensional region in which the control is located, that the control blocks the display position, (e.g., i is a positive integer less than or equal to n).

In a possible design, the transparency change module 660 is configured to determine, in accordance with a determination that the i target points are located in the two-dimensional region in which the control is located, that the control has an $i^{th}$-level blocking relationship to the display position; query an $i^{th}$-level transparency corresponding to the $i^{th}$-level blocking relationship in a correspondence, the correspondence including correspondences between different blocking relationships and different transparencies; and determine the $i^{th}$-level transparency as the second transparency.

In a possible design, the transparency change module 660 is configured to reduce the transparency of the control in accordance with a determination that the control does not block the display position.

In a possible design, the transparency change module 660 is configured to suddenly change the transparency of the control from the second transparency to the first transparency in accordance with a determination that the control does not block the display position, the first transparency being lower than the second transparency: or gradually reduce the transparency of the control from the second transparency to the first transparency in accordance with a determination that the control does not block the display position, the first transparency being lower than the second transparency.

In a possible design, the transparency change module 660 is configured to reduce the transparency of the control in response to an approaching operation triggered by a hover gesture (on a suspended position) above the control.

Figure 9:
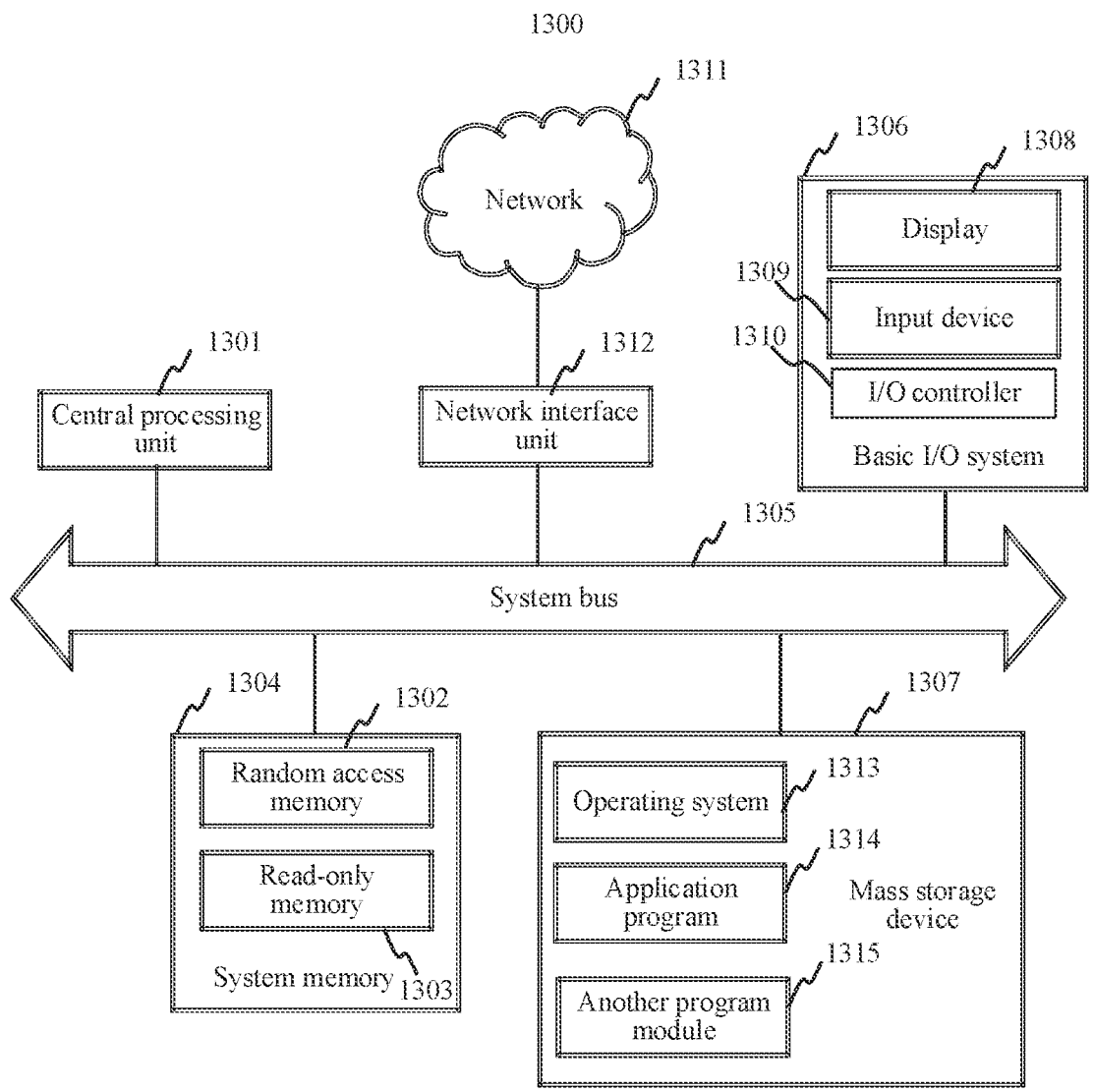
FIG. 9 is a block diagram of a computer device according to an exemplary embodiment of this application.

FIG. 9 is a block diagram of a computer device according to an exemplary embodiment. The computer device may include a terminal. The terminal 1300 includes a central processing unit (CPU) 1301, a system memory 1304 including a random access memory (RAM) 1302 and a read-only memory (ROM) 1303, and a system bus 1305 connecting the system memory 1304 and the CPU 1301. The computer device 1300 further includes a basic input/output (I/O) system 1306 assisting in transmitting information between components in the computer device, and a mass storage device 1307 configured to store an operating system 1313, an application program 1314, and another program module 1315.

The basic I/O system 1306 includes a display 1308 configured to display information and an input device 130) such as a mouse or a keyboard that is used for inputting information by a user. The display 1308 and the input device 1309 are connected to the CPU 1301 by being connected to an I/O controller 1310 of the system bus 1305. The basic I/O system 1306 may further include the I/O controller 1310 configured to receive and process inputs from multiple other devices such as a keyboard, a mouse, and an electronic stylus. Similarly, the I/O controller 1310 further provides an output to a display, a printer, or another type of output device.

The mass storage device 1307 is connected to the CPU 1301 by using a mass storage controller (not shown) connected to the system bus 1305. The mass storage device 1307 and a computer-device-readable medium associated with the mass storage device provide non-volatile storage to the computer device 1300. That is, the mass storage device 1307 may include a computer-device-readable medium (not shown) such as a hard disk or a compact disc ROM (CD-ROM) drive.

Generally, the computer-device-readable medium may include a computer device storage medium and a communication medium. The computer device storage medium includes volatile and non-volatile, removable and non-removable media that are configured to store information such as computer-device-readable instructions, data structures, program modules, or other data and that are implemented by using any method or technology. The computer device storage medium includes a RAM, a ROM, an erasable programmable ROM (EPROM), an electrically erasable programmable ROM (EEPROM), a CD-ROM, a digital video disc (DVD) or another optical memory, a magnetic cassette, a magnetic tape, a magnetic disk memory, or another magnetic storage device. Certainly, a person skilled in the art can learn that the computer device storage medium is not limited to the foregoing several types. The system memory 1304 and the mass storage device 1307 may be collectively referred to as a memory.

According to the embodiments of the present disclosure, the computer device 1300 may be further connected, through a network such as the Internet, to a remote computer device on the network to run. That is, the computer device 1300 may be connected to a network 1311 by using a network interface unit 1312 connected to the system bus 1305, or may be connected to another type of network or a remote computer device system (not shown) by using a network interface unit 1312.

The memory further includes one or more programs. The one or more programs are stored in the memory. The CPU 1301 executes the one or more programs to implement all or some steps of the control display method.

In an exemplary embodiment, a computer-readable storage medium is further provided. The computer-readable storage medium stores at least one instruction, at least one program, a code set, or an instruction set, the at least one instruction, the at least one program, the code set, or the instruction set being loaded and executed by a processor to implement the control display method provided in the foregoing method embodiments.

In an exemplary embodiment, a computer program product or a computer program is provided. The computer program product or the computer program includes computer instructions, the computer instructions being stored in a computer-readable storage medium. A processor of a computer device reads the computer instructions from the computer-readable storage medium, and executes the computer instructions, causing the computer device to perform the control display method provided in the foregoing method embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a ROM, a magnetic disk, an optical disc, or the like.

The foregoing descriptions are merely optional embodiments of this application, but are not intended to limit this application. Any modification, equivalent replacement, or improvement made within the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs a control display method. In practical application, the foregoing functions may be allocated to and completed by different functional modules according to requirements, that is, an inner structure of a device is divided into different functional modules to implement all or a part of the functions described above.

What is claimed is:

1. A control display method for an electronic device, the method comprising:
    displaying a graphical user interface (GUI), the GUI comprising (i) a two-dimensional picture of a user-controlled virtual character and a plurality of opponent virtual characters located in a three-dimensional virtual environment and captured by a virtual camera, and (ii) a two-dimensional control;
    updating a display position of at least one of the plurality of opponent virtual characters in the two-dimensional picture by converting a current location of the at least one of the plurality of opponent virtual characters in the three-dimensional virtual environment into a location in the two-dimensional picture based on a current position of the virtual camera and a movement of the at least one of the plurality of opponent virtual characters in the three-dimensional virtual environment;
    determining if the control blocks the display of the at least one of the plurality of opponent virtual characters based on the updated display position in the two-dimensional picture and display position of the two-dimensional control; and
    in accordance with a determination that the control blocks the at least one of the plurality of opponent virtual characters at the updated display position:
        adjusting a transparency of the control to a predefined transparency in accordance with a determination that the control blocks the at least one of the plurality of opponent virtual characters.

2. The method according to claim 1, wherein adjusting the transparency of the control comprises:
    switching the transparency of the control from a first transparency directly to a second transparency, wherein the first transparency is lower than the second transparency; or
    gradually increasing the transparency of the control from the first transparency to the second transparency.

3. The method according to claim 1, wherein the predefined transparency of the control positively correlates with a blocking degree of the display position by the control, wherein the blocking degree indicates a size of a blocked area of the at least one of the plurality opponent virtual characters by the control on the GUI.

4. The method according to claim 2, further comprising:
    obtaining three-dimensional coordinates of a target point on the at least one of the plurality opponent virtual characters at the updated display position in the virtual environment;
    mapping the three-dimensional coordinates to the updated display position based on a conversion matrix; and
    determining, based on a positional relationship between the updated display position and a two-dimensional region in which the control is located, whether the control blocks the updated display position.

5. The method according to claim 4, further comprising:
    obtaining three-dimensional coordinates of a first plurality of target points, and wherein determining whether the control blocks the updated display position comprises:
        in accordance with a determination that a second plurality of target points of the first plurality of target points on the at least one of the plurality opponent virtual characters is located in the two-dimensional region in which the control is located:
            determining that the control blocks the updated display position, wherein the second plurality of target points is less than or equal to the first plurality of target points.

6. The method according to claim 5, further comprising:
    in accordance with the determination that the second plurality of target points is located in the two-dimensional region in which the control is located:
        determining that the control has a corresponding level of blocking to the updated display position; and
        setting a corresponding level of transparency associated with the corresponding level of blocking as the second transparency.

7. The method according to claim 1, further comprising:
    in accordance with a determination that the control does not block the updated display position:
        reducing the transparency of the control.

8. The method according to claim 7, wherein reducing the transparency of the control comprises:
    switching the transparency of the control from a second transparency to a first transparency being lower than the second transparency; or
    gradually reducing the transparency of the control from the second transparency to the first transparency.

9. The method according to claim 1, further comprising:
    after increasing the transparency of the control:
        reducing the transparency of the control in response to a hover gesture above the control.

10. An electronic device, comprising:
    one or more processors; and
    memory storing one or more programs, the one or more programs comprising instructions that, when executed by the one or more processors, cause the one or more processors to perform operations comprising:
        displaying a graphical user interface (GUI), the GUI comprising (i) a two-dimensional picture of a user-controlled virtual character and a plurality of opponent virtual characters located in a three-dimensional virtual environment and captured by a virtual camera, and (ii) a two-dimensional control;
        updating a display position of at least one of the plurality of opponent virtual characters in the two-dimensional picture by converting a current location of the at least one of the plurality of opponent virtual characters in the three-dimensional virtual environment into a location in the two-dimensional picture based on a current position of the virtual camera and a movement of the at least one of the plurality of opponent virtual characters in the three-dimensional virtual environment;

determining if the control blocks the display of the at least one of the plurality of opponent virtual characters based on the updated display position in the two-dimensional picture and display position of the two-dimensional control; and in accordance with a determination that the control blocks the at least one of the plurality of opponent virtual characters at the updated display position:

adjusting a transparency of the control to a predefined transparency in accordance with a determination that the control blocks the at least one of the plurality of opponent virtual characters.

11. The electronic device according to claim 10, wherein adjusting the transparency of the control comprises:

switching the transparency of the control from a first transparency directly to a second transparency, wherein the first transparency is lower than the second transparency; or gradually increasing the transparency of the control from the first transparency to the second transparency.

12. The electronic device according to claim 10, wherein the predefined transparency of the control positively correlates with a blocking degree of the display position by the control, wherein the blocking degree indicates a size of a blocked area of the at least one of the plurality opponent virtual characters by the control on the GUI.

13. The electronic device according to claim 11, wherein the operations further comprise:

obtaining three-dimensional coordinates of a target point on the at least one of the plurality opponent virtual characters at the updated display position in the virtual environment;

mapping the three-dimensional coordinates to the display position based on a conversion matrix; and determining, based on a positional relationship between the updated display position and a two-dimensional region in which the control is located, whether the control blocks the updated display position.

14. The electronic device according to claim 13, wherein the operations further comprise:

obtaining three-dimensional coordinates of a first plurality of target points, and wherein determining whether the control blocks the updated display position comprises:

in accordance with a determination that a second plurality of target points of the first plurality of target points on the at least one of the plurality opponent virtual characters is located in the two-dimensional region in which the control is located:

determining that the control blocks the updated display position, wherein the second plurality of target points is less than or equal to the first plurality of target points.

15. The electronic device according to claim 14, wherein the operations further comprise:

in accordance with the determination that the second plurality of target points is located in the two-dimensional region in which the control is located:

determining that the control has a corresponding level of blocking to the updated display position; and setting a corresponding level of transparency associated with the corresponding level of blocking as the second transparency.

16. The electronic device according to claim 10, wherein the operations further comprise:

in accordance with a determination that the control does not block the updated display position:

reducing the transparency of the control.

17. The electronic device according to claim 16, wherein reducing the transparency of the control comprises:

switching the transparency of the control from a second transparency to a first transparency being lower than the second transparency; or gradually reducing the transparency of the control from the second transparency to the first transparency.

18. The electronic device according to claim 10, wherein the operations further comprise:

after increasing the transparency of the control:

reducing the transparency of the control in response to a hover gesture above the control.

19. A non-transitory computer-readable storage medium, storing a computer program, the computer program, when executed by one or more processors of an electronic device, causes the one or more processors to perform operations comprising:

displaying a graphical user interface (GUI), the GUI comprising (i) a two-dimensional picture of a user-controlled virtual character and a plurality of opponent virtual characters located in a three-dimensional virtual environment and captured by a virtual camera, and (ii) a two-dimensional control;

updating a display position of at least one of the plurality of opponent virtual characters in the two-dimensional picture by converting a current location of the at least one of the plurality of opponent virtual characters in the three-dimensional virtual environment into a location in the two-dimensional picture based on a current position of the virtual camera and a movement of the at least one of the plurality of opponent virtual characters in the three-dimensional virtual environment;

determining if the control blocks the display of the at least one of the plurality of opponent virtual characters based on the updated display position in the two-dimensional picture and display position of the two-dimensional control; and in accordance with a determination that the control blocks the at least one of the plurality of opponent virtual characters at the updated display position:

adjusting a transparency of the control to a predefined transparency in accordance with a determination that the control blocks the at least one of the plurality of opponent virtual characters.

20. The non-transitory computer-readable storage medium according to claim 19, wherein an increased transparency of the control positively correlates with a blocking degree of the display position by the control, wherein the blocking degree indicates a size of a blocked area of the at least one of the plurality opponent virtual characters by the control on the GUI.

* * * * *